US012578444B1

(12) United States Patent
Chen et al.

(10) Patent No.: US 12,578,444 B1
(45) Date of Patent: Mar. 17, 2026

(54) DETERMINING PHASE DELAY IN TIME-OF-FLIGHT SENSORS

(71) Applicant: Zoox, Inc., Foster City, CA (US)

(72) Inventors: Yongzhe Chen, Santa Clara, CA (US); Robert Nicholas Moor, San Mateo, CA (US); Jonathan Solheim, Santa Clara, CA (US); Shaminda Subasingha, San Ramon, CA (US); He Yi, Mountain View, CA (US); Wuyang Yu, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 209 days.

(21) Appl. No.: 18/385,904

(22) Filed: Oct. 31, 2023

(51) Int. Cl.
*G01S 7/4915* (2020.01)
*G01S 17/931* (2020.01)

(52) U.S. Cl.
CPC .......... *G01S 7/4915* (2013.01); *G01S 17/931* (2020.01)

(58) Field of Classification Search
CPC ............................ G01S 7/4915; G01S 17/931
See application file for complete search history.

(56) References Cited

U.S. PATENT DOCUMENTS

| | | | | |
|---|---|---|---|---|
| 10,649,459 | B2 | 5/2020 | Wang | |
| 2020/0355809 | A1* | 11/2020 | Gimpel | G01B 11/00 |
| 2021/0080554 | A1* | 3/2021 | Kang | G01S 17/08 |
| 2021/0210543 | A1* | 7/2021 | Hseih | G01S 17/86 |
| 2022/0043116 | A1* | 2/2022 | Jin | G01S 7/484 |

OTHER PUBLICATIONS

U.S. Appl. No. 17/553,420, filed Dec. 16, 2021, Solheim, et al., "Multipath Resolution of TOF Signals", 37 pages.

* cited by examiner

*Primary Examiner* — Ig T An

(74) *Attorney, Agent, or Firm* — Lee & Hayes, P.C.

(57) ABSTRACT

Techniques for determining a phase delay of a received light signal are discussed herein. A vehicle may emit a continuous light signal from a ToF device. The ToF device may include a sensor receiver configured to receive the signal after the signal reflects off surface(s) in the environment. To determine the distance between the ToF device and the surface(s), the vehicle may sample the received signal at two or more offsets and identify regions of overlap between the offset signals and the received signal. The vehicle can determine area measurements of the overlapping regions and use such area measurements to determine normalized amplitudes for each of the overlapping regions and, based on comparing such values, determine linear equation(s) corresponding to the phase delay. The vehicle can evaluate such linear equations to determine the phase delay of the received light signal. The vehicle can be controlled based on the phase delay.

20 Claims, 6 Drawing Sheets

300

600 ⟍

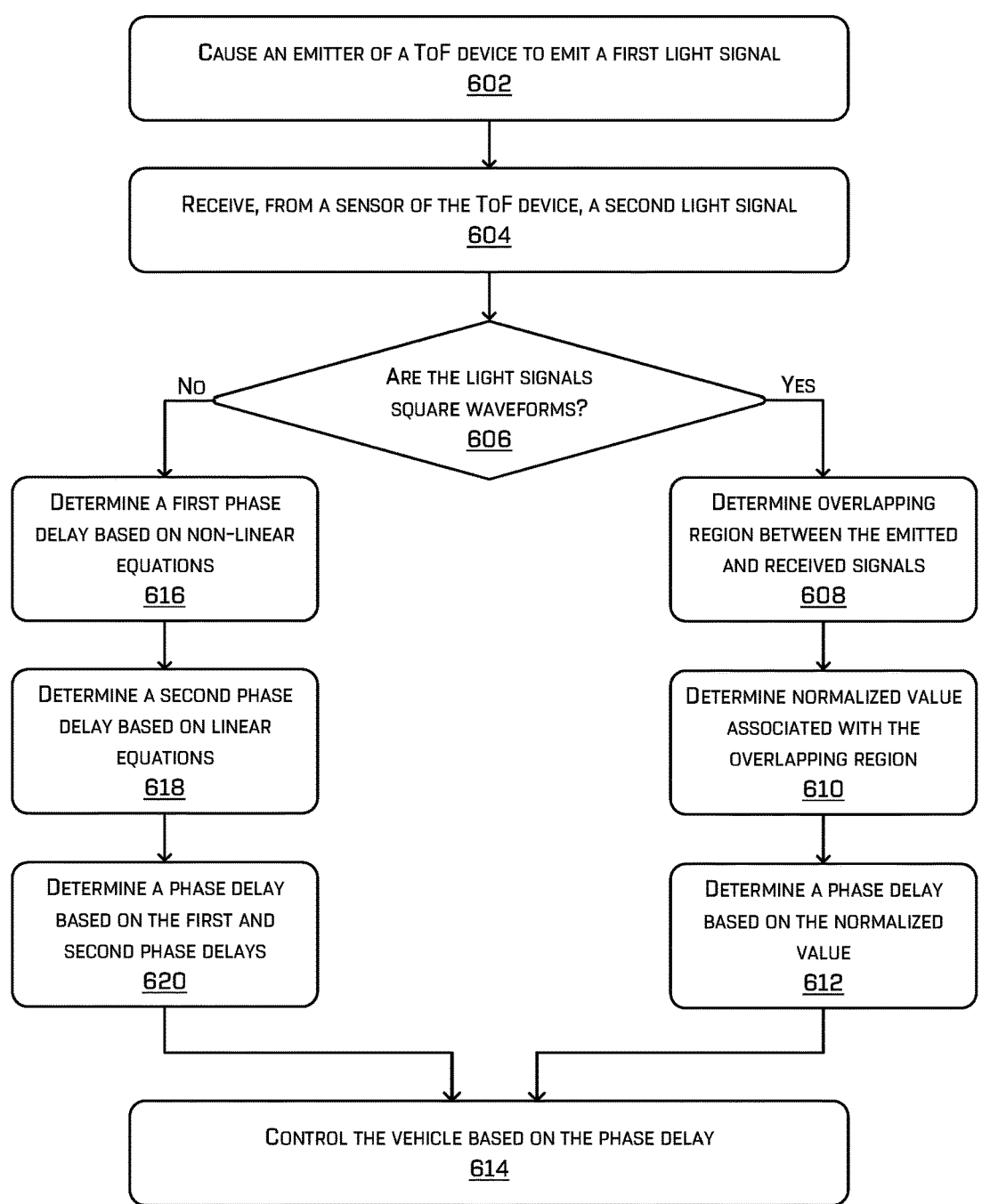

CAUSE AN EMITTER OF A ToF DEVICE TO EMIT A FIRST LIGHT SIGNAL
602

RECEIVE, FROM A SENSOR OF THE ToF DEVICE, A SECOND LIGHT SIGNAL
604

ARE THE LIGHT SIGNALS
SQUARE WAVEFORMS?
606

No

YES

DETERMINE A FIRST PHASE
DELAY BASED ON NON-LINEAR
EQUATIONS
616

DETERMINE OVERLAPPING
REGION BETWEEN THE EMITTED
AND RECEIVED SIGNALS
608

DETERMINE A SECOND PHASE
DELAY BASED ON LINEAR
EQUATIONS
618

DETERMINE NORMALIZED VALUE
ASSOCIATED WITH THE
OVERLAPPING REGION
610

DETERMINE A PHASE DELAY
BASED ON THE FIRST AND
SECOND PHASE DELAYS
620

DETERMINE A PHASE DELAY
BASED ON THE NORMALIZED
VALUE
612

CONTROL THE VEHICLE BASED ON THE PHASE DELAY
614

FIG. 6

DETERMINING PHASE DELAY IN TIME-OF-FLIGHT SENSORS

BACKGROUND

Sensors, such as time-of-flight (ToF) sensors, generally measure the distance from a ToF device to a surface by transmitting a light wave and receiving a reflection of the light wave from the surface, which may be read by a sensor of the ToF device. The sensor may generate a signal based on a light wave returning to the sensor. For indirect ToF devices, the sensors may determine the distance to the surface based on identifying a phase delay of the light wave that was received by the ToF device relative to the light wave that was emitted from the ToF device. In such instances, based on determining the phase delay of the returned light wave, the ToF device can use the phase delay to determine the distance. However, in some cases, techniques for determining the phase delay can result in inaccurate and/or suboptimal phase delay, and ultimately distance measurements. Such inaccuracies may result in unsafe behavior of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 6 is a flow diagram illustrating an example technique for receiving sensor data, determining a phase delay based on the sensor data, and controlling a vehicle based on the phase delay, in accordance with one or more examples of the disclosure.

DETAILED DESCRIPTION

Figure 1:
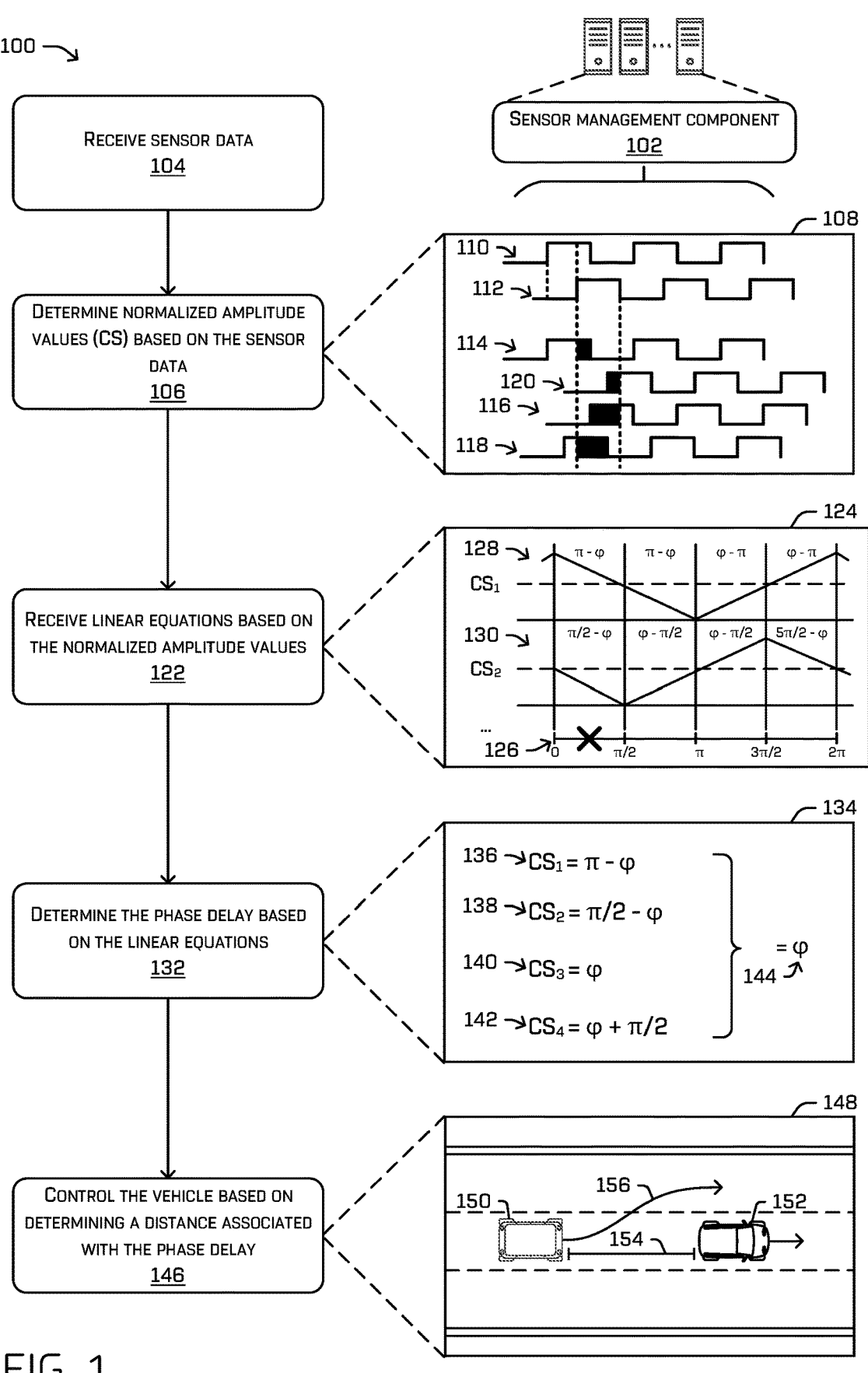
FIG. 1 is a pictorial flow diagram illustrating an example technique for receiving sensor data, determining normalized amplitude values based on the sensor data, determining linear equations based on the normalized amplitude values, determining a phase delay based on the linear equations, and controlling a vehicle based on the phase delay, in accordance with one or more examples of the disclosure.

As described above, techniques for determining a phase delay of a received light signal can result in inaccurate and/or suboptimal measurements. Such inaccuracies may result in unsafe behavior of a vehicle.

Techniques for determining a phase delay of a received light signal are discussed herein. In some examples, linear equations may be used to enable a vehicle to accurately measure the phase delay of received light signals of a ToF device. In some examples, a vehicle (such as an autonomous vehicle) may emit a continuous modulated light signal from a ToF device. In such instances, the ToF device may include a sensor receiver configured to receive the signal after the signal reflects off one or more surfaces in the environment. To determine the distance between the ToF device and the surface(s), the vehicle may determine a phase delay of the received signal relative to the emitted signal. For example, the vehicle may sample the received signal at two or more offsets (or shifts) (e.g., shift the return signal 90 degrees, 180 degrees, 270 degrees, etc.). In such instances, the vehicle can identify regions of overlap between the offset signals and the received signal. Further, the vehicle can determine area measurements of the overlapping regions and use such area measurements to determine the amplitude of the received light signal. In some instances, the vehicle can determine a normalized amplitude for each of the overlapping regions and, based on comparing such values, determine one or more linear equations corresponding to the phase delay. In such instances, the vehicle can evaluate such linear equations to determine the phase delay of the received light signal. The vehicle can be controlled based on the phase delay. As described in more detail below, the techniques described herein may improve safety and efficiency of systems which rely on such measurements (e.g., vehicles) by ensuring accurate phase delay measurements are being used and evaluated by the vehicle, thereby generating more efficient and accurate actions. Further, such techniques may enable faster determinations of the phase delay while consuming less computational resources.

When determining the phase delay of a return signal from a ToF device, conventional systems and/or techniques may be inaccurate, inefficient, and/or result in delayed measurements. For example, a ToF device may emit a light signal into an environment. In some instances, the light signal may reflect off one or more surfaces located in the environment and return the ToF device. The vehicle can analyze and/or evaluate the return signal to determine the distance of such surfaces relative the ToF device. For instance, the vehicle can determine a phase delay of the return signal by comparing the emitted light signal with the return light signal. However, when determining the phase delay, conventional systems may assume the emitted and received light signals are sinusoidal waveforms. Determining the phase delay of a sinusoidal waveform may include using various non-linear functions resulting in excessive compute as well as inaccurate phase delay measurements when the waveform is a square wave. Since the phase delay may be used to determine the distance measurements, inaccurate distance measurements can result in the vehicle performing actions based on the belief that the object is in a certain location when the object is actually in a different location. As such, the limitations to the conventional techniques may result in the vehicle performing unsafe and/or suboptimal actions.

To address these and other technical problems and inefficiencies, the systems and/or techniques described herein include a sensor management system (which also may be referred to as a "sensor management component" or "sensor manager") configured to determine accurate phase delay measurements of the sensor data captured by ToF devices. Further, the sensor management component can identify various linear equations to determine the phase delay of a return signal. Technical solutions discussed herein solve one or more technical problems associated with conventional sensor systems leading to delayed, inaccurate, and/or insufficient phase delay measurements.

In some examples, a sensor management component may emit a continuous modulated light signal (e.g., carrier) from one or more ToF devices of an autonomous vehicle traversing within an environment. In some examples, the autonomous vehicle may include multiple ToF devices configured to receive sensor data representative of the driving environment. Such ToF devices may be located or otherwise mounted at any location in or on the vehicle. Further, such ToF devices may include one or more emitters (e.g., vertical cavity surface emitting laser (or VCSEL)) configured to emit light waves (e.g., square waves) into the environment. That is, the vehicle may include multiple ToF devices located at various different positions and/or angles, and such ToF devices may each contain multiple emitters.

In some examples, the sensor management component may receive a second light signal from a ToF receiver. The ToF device may include a sensor receiver (e.g., CMOS sensor) configured to capture or otherwise receive light signals (e.g., square waves) after such signals have exited the ToF device and reflected off object(s) in the environment. In some examples, the sensor receiver may be located horizontally adjacent to the emitter(s). That is, the second sensor receiver may be positioned side-by-side with the light emitter of the ToF device. In such instances, after the ToF emitter emits a light signal into the environment, the signal may reflect off one or more objects and return to the sensor receiver of the ToF device.

In some examples, the sensor management component may determine a phase delay of the received light signal. As described below, the sensor management component may determine multiple offset return signals and evaluate such offset return signals to determine a phase delay of the light signal received by the sensor receiver.

For example, the sensor management component may cross-correlate the received light signal with the emitted light signal. The sensor management component may cross-correlate the signals to identify a region (or area) of overlap between the two signals. The sensor management component may cross-correlate the received signal (e.g., square wave) with the emitted signal (e.g., square wave) at four evenly spaced locations over the course of one oscillation of the received signal. Such sampling locations of the cross-correlated signal may include 0°, 90°, 180°, 270°, etc. As such, the sensor management component may determine four light signals that are offset at differing degrees and cross-correlate such offset light signals with the received signal. Accordingly, the sensor management component may determine a region of overlap for each of the offset light signals.

In some examples, the sensor management component may determine the area of the overlapping regions. The sensor management component may determine the area of the overlapping region by integrating the overlapping region. In such instances, the sensor management component may include one or more hardware components configured to perform such techniques for determining the area. Performing such techniques on the ToF hardware may reduce the amount of computational resources required to determine the area of the overlapping region. As an example, the sensor management component may determine four offset light signals (e.g., signal 1, signal 2, signal 3, and signal 4) and determine an overlapping region for each of the offset signals by cross-correlating such signals with the reflected signal. That is, the sensor management component may determine a first overlapping region based on cross-correlating signal 1 with the received signal, a second overlapping region based on cross-correlating signal 2 with the received signal, a third overlapping region based on cross-correlating signal 3 with the received signal, and a fourth overlapping region based on cross-correlating signal 4 with the received signal. In such instances, the sensor management component may determine the area of each of the first, second, third, and fourth overlapping regions.

In some examples, the sensor management component may determine an amplitude and the phase delay of the received signal based on analyzing the multiple offset light signals. To determine the phase delay of the received signal, the sensor management component may determine the amplitude of the phase delay based on the area measurements described above. That is, the sensor management component may determine the amplitude of the received signal by summing the area measurements of the first, second, third, and fourth overlapping regions. In some examples, based on determining the amplitude of the received signal, the sensor management component may determine a normalized amplitude (which also may be referred to as a normalized correlation sample (e.g., CS)) corresponding to each of the overlapping regions and/or offset light signals. In some examples, the sensor management component may determine the CS according to the following:

$$CS_i = (2\pi/\alpha)*(Q_i) \hspace{2cm} \text{Equation 1}$$

In Equation 1 above, $CS_i$ may correspond to a normalized correlation sample of the offset light signal (having an index i for each such channel), $\alpha$ may correspond to the amplitude determined by summing together the area measurements of all of the overlapping regions, and $Q_i$ may correspond to the area measurement of the specific overlapping region. For instance, the sensor management component may determine four different CS measurements—one for each of the overlapping regions or offset light signals. In such instances, the first overlapping region may correspond to a normalized value (e.g.. $CS_1$) between (0, 2π), the second overlapping region may correspond to a normalized value (e.g. $CS_2$) between (0, 2π), the third overlapping region may correspond to a normalized value (e.g. $CS_3$) between (0, 2π), and the fourth overlapping region may correspond to a normalized value (e.g. $CS_4$) between (0, 2π).

In some examples, the sensor management component may map the CS measurements to one or more linear representations (or linear equations) that, upon evaluation, may include the phase delay of the received light signal. In some examples, the sensor management component may include a database containing linear equations that map to specific CS measurements and light signal offsets. That is, the database may include, for the offset light signal at 90°, one or more linear equations. In such instances, the database may include one or more other linear equations for each of the other light signals offset at 0°, 180°, and/or 270°. In some examples, the linear equations may be mapped to a range of values spanning the wave oscillation cycle (e.g., (0, 2π)). For instance, for the offset light signal at 90°, the database may discretize the oscillation cycle into various ranges, such as (0, π/2), (π/2, π), (π, 3π/2), (3π/2, 2π). Of course, in other examples, there may be more or less ranges and such ranges may not be equidistant. In such examples, the database may include a linear equation mapped to each of the ranges. That is, the range of (0, π/2) may include (or map to) a first linear equation, the range (π/2, π) may include a second linear equation, the range (π, 3π/2) may include a third linear equation, and the range (3π/2, 2π) may include a fourth linear equation. In such instances, some or all of the signal offsets may also be discretized into such ranges with each range including linear equations.

In some examples, the sensor management component may compare the CS values to determine within which discretized range the phase delay is located. In such instances, the sensor management component may input the CS values into a comparator function configured to determine within which range the phase delay is located. In such instances, based on the comparison, the sensor management component may determine that, for each of the offset signals, the phase delay is located within a specific range. For instance, the comparison operation may indicate that the phase delay is located within the $(0, \pi/2)$ range. As such, the sensor management component may access the database to receive the linear equations that map to that range for each of the CS values.

In such instances, the sensor management component may determine the phase delay based on the linear equations mapped to the region of $(0, \pi/2)$. The sensor management component may identify four linear equations corresponding to the four different signal offsets. In such instances, the sensor management component may determine the phase delay based on solving such linear equations. For instance, since there may be four linear equations, the sensor management component may determine the phase delay for each of the four linear equations. In such instances, to determine the phase delay of the received light signal, the sensor management component may select or otherwise determine one of the individual phase delays determined by the linear equations; however, in other examples, the sensor management component may determine that the phase delay based on an average of the four phase delays determined by the four linear equations.

In some examples, the sensor management component may send the phase delay to one or more other perception components, prediction components, or planning components for further processing. In some instances, such components may use the phase delay to determine or otherwise measure the distance from the vehicle to objects in the environment. In such instances, the vehicle may use such data to determine actions for the vehicle to follow. Accordingly, the vehicle may use the phase delay and/or distance measurement to accurately determine vehicle actions. As such, the vehicle may be controlled based on such actions.

Additionally or alternatively, the sensor management component may determine the phase delay based on linear and non-linear operations. That is, the sensor management component may use a combination of linear and non-linear equations to determine the phase delay. In some examples, the sensor management component may determine that the emitted and/or received light signal is not a perfect square wave. In such instances, the sensor management component may determine the phase delay using the linear equations described above, as well as non-linear equations described in U.S. application Ser. No. 17/553,420, filed on Dec. 16, 2021, and titled "Multipath Resolution of ToF Signals," the content of which is herein incorporated by reference in its entirety and for all purposes. In some instances, the sensor management component may determine the shape of a signal based on analyzing the slope of the signal at various locations. Accordingly, the sensor management component may determine the phase delay based on a weighted average of the phase delay determined using linear equations and the phase delay determined using non-linear equations.

Although the operations described above may be performed with respect to an indirect ToF sensor device, such operations may also be performed on the sensor data received by direct time-of-flight sensor devices (e.g., lidar devices).

The techniques described herein can improve the functioning, safety, and efficiency of the time-of-flight sensor devices as well as the autonomous and semi-autonomous vehicles operating in various driving environments. The use of linear equations to determine the phase delay significantly reduces the overall computational complexity needed to determine the phase delay. For instance, conventional systems may assume the received waveform is a sinusoidal wave which, when determining the area and/or phase delay of a sinusoidal waveform, may require the system to use various non-linear equations that potentially may introduce computation complexity and delay.

The techniques described herein may be implemented in several ways. Example implementations are provided below with reference to the following figures. Although discussed in the context of an autonomous vehicle, the methods, apparatuses, and systems described herein may be applied to a variety of systems, and are not limited to autonomous vehicles. In another example, the techniques may be utilized in an aviation or nautical context, or in any other system. Additionally, the techniques described herein may be used with real data (e.g., captured using sensor(s)), simulated data (e.g., generated by a simulator), or any combination of the two.

FIG. 1 is a pictorial flow diagram illustrating an example process 100 for receiving sensor data, determining normalized amplitude values based on the sensor data, determining linear equations based on the normalized amplitude values, determining a phase delay based on the linear equations, and controlling a vehicle based on the phase delay. As shown in this example, some or all the operations in the example process 100 may be performed by a sensor management component 102 of a ToF device and/or within a perception component, a prediction component, a planning component, and/or any other components and systems within the autonomous vehicle. For instance, as shown in this example, example process 100 may be implemented using a sensor management component 102. As described below in more detail, the sensor management component 102 may include various subcomponents, such as an area determining component, an amplitude component, and/or a phase delay component.

At operation 104, the sensor management component 102 may receive sensor data. In some examples, a vehicle may include one or more sensor devices mounted at various locations. Such sensor devices may be configured to capture data representative of the environment proximate the vehicle. In some instances, one or more of the sensor devices may be a ToF sensor device. The ToF sensor device(s) may include one or more emitters configured to emit continuous, modulated light signals into the environment. Such signals may reflect off various objects in the environment prior to returning to a sensor receiver of the ToF sensor device. As described below, the sensor management component 102 may analyze and/or evaluate such sensor data to detect and/or classify object(s) in the environment.

At operation 106, the sensor management component 102 may determine normalized amplitude values based on the sensor data received at operation 104. The sensor management component 102 may cross-correlate the received light signal with the emitted light signal at four evenly spaced locations over the course of one oscillation cycle of the received light signal. In such instances, the sensor management component 102 may determine area measurements for the four overlapping regions. Such area measurements may be used to determine an amplitude of the received light signal, and subsequently the normalized amplitudes of each of the overlapping regions, which may be linearly correlated with the phase delay. For example, the box 108 illustrates a plurality of light signals corresponding to the sensor data received at operation 104. As shown, the light signals in box 108 may be square waves; however, in other examples, the light signals may be represented as any type of waveform. In this example, the box 108 may include an emitted light signal 110 which may be the light signal emitted from the emitter of the ToF sensor device described in operation 104. The box 108 may also include a received signal 112 which may correspond to the sensor data received at operation 104. In this example, the box 108 may also include the received light signal 112 offset according to four evenly spaced locations over the course of one oscillation of the received signal 112. For instance, the box 108 may include a light signal 114 offset at a 0° offset, a light signal 120 offset at a 90° offset, a light signal 116 offset at a 1800 offset, a light signal 118 offset at a 270° offset.

In some examples, the sensor management component 102 may cross-correlate the received signal 112 with the four offset light signals. Cross-correlating between the light signals may identify a region of overlap between the two signals. As shown, the box 108 may illustrate such regions of overlap as a black rectangle. That is, the light signal 114 may include a region of overlap represented as a black rectangle between the two dashed lines. Further, the light signal 116, the light signal 118, and the light signal 120 may each also include a region of illustrated as a black rectangle between the two dashed lines.

In some examples, the sensor management component 102 may determine an area for each of the regions of overlap. That is, the sensor management component 102 may determine, for each of the black rectangular regions, an area measurement. As noted above, such operations may be performed on the ToF sensor hardware which may integrate the regions of overlap. In such instances, the sensor management component 102 may determine a first area measurement corresponding to the overlapping region between the received light signal 112 and the light signal 114, a second area measurement corresponding to the overlapping region between the received light signal 112 and the light signal 116, a third area measurement corresponding to the overlapping region between the received light signal 112 and the light signal 118, and a fourth area measurement corresponding to the overlapping region between the received light signal 112 and the light signal 120.

In some examples, the sensor management component 102 may determine a normalized amplitude for each of the overlapping regions. The sensor management component 102 may determine an amplitude value based on the result of summing together the area measurements of all of the overlapping regions. Further, for each of the overlapping regions, the sensor management component 102 may determine a normalized amplitude value. In some examples, the normalized amplitude may also be referred to as a correlation sample (e.g., CS). The sensor management component 102 may determine the CS values according to the following:

$$CS_i = (2\pi/\alpha)*(Q_i) \hspace{3em} \text{Equation 1}$$

Where $CS_i$ corresponds to a normalized correlation sample of the offset light signal, the $\alpha$ corresponds to the amplitude determined by summing the area measurements of all of the overlapping regions (e.g., black rectangular regions), and $Q_i$ corresponds to the area measurement of the specific overlapping region. In this example, the sensor management component 102 may determine, as a CS value for the region of overlap corresponding to the light signal 114, $CS_1 = (2\pi/a)*(Q_1)$, where $Q_1$ is the area of the overlapping region between the light signal 112 and the light signal 114. Further, the sensor management component may determine a CS value for the region of overlap corresponding to the light signal 120, $CS_2 = (2\pi/a)*(Q_2)$, where $Q_2$ is the area of the overlapping region between the light signal 112 and the light signal 120, determine, as a CS value for the region of overlap corresponding to the light signal 116, $CS_3 = (2\pi/a)*(Q_3)$, where $Q_3$ is the area of the overlapping region between the light signal 112 and the light signal 116, determine, as a CS value for the region of overlap corresponding to the light signal 118, $CS_4 = (2\pi/a)*(Q_4)$, where $Q_4$ is the area of the overlapping region between the light signal 112 and the light signal 118. As such, the sensor management component 102 may determine a normalized amplitude $CS_1$, $CS_2$, $CS_3$, and $CS_4$. Such values may be between $(0, 2\pi)$.

At operation 122, the sensor management component 102 may receive linear equations based on the normalized amplitude (CS) values. For example, box 124 illustrates a graph spanning the oscillation cycle of the light signal with multiple linear equations being mapped to different regions shown therein. In this example, the box 124 may include a timeline 126 that is discretized into various different ranges of the oscillations cycle. As shown, the timeline 126 may start at "0" and span to "$2\pi$;" however, in other examples, the timeline 126 may start or stop at different time ranges. As shown, the timeline may include one or more markings at each $\pi/2$. Accordingly, the timeline 126 may include "0," "$\pi/2$," "$\pi$," "$3\pi/2$," and "$2\pi$." In some examples, the box 124 may include linear equations mapped to regions within the timeline 126.

In some examples, the box 124 may include a graph with multiple subgraphs. As shown, the graph may include a subgraph 128 corresponding to the phase delay of light signal 114 and a subgraph 130 corresponding to the phase delay of the light signal 120. As shown the subgraph 128 and the subgraph 130 may be discretized into various regions of the timeline 126. Further, the subgraphs may include a linear equation mapped to each region. For example, the subgraph 128 may include a region from $(0, \pi/2)$, a region from $(\pi/2, \pi)$, a region from $(\pi, 3\pi/2)$, and a region from $(3\pi/2, 2\pi)$. Further, the region from $(0, \pi/2)$ may include a linear equation $CS_1 = \pi - \varphi$, the region from $(\pi/2, \pi)$ may include a linear equation $CS_1 = \pi - \varphi$, the region from $(\pi, 3\pi/2)$ may include a linear equation $CS_1 = \varphi - \pi$, the region from $(3\pi/2, 2\pi)$ may include a linear equation $CS_1 = \varphi - \pi$. In some examples, the sensor management component 102 may receive the linear equation based on the region within which the phase delay is located.

For example, the sensor management component 102 may determine within which region of the timeline 126 the phase delay is located based on comparing the CS values. The sensor management component 102 may input the CS values into a comparator configured to determine within which region of the timeline 126 the phase delay is located. In this example, based on the comparison, the sensor management component 102 may determine that the phase delay is located in the region from $(0, \pi/2)$. As shown, the box 124 may include an "X" that represents the region of the timeline 126 that the phase delay of the received signal 112 is located within. Additional details for comparing the CS values are described with respect to FIG. 2.

Based on determining that the phase delay is within the region of $(0, \pi/2)$, the sensor management component 102 may receive the linear equations corresponding to the region of $(0, \pi/2)$ in the various subgraphs. That is, the sensor management component 102 may retrieve, from the subgraph 128, the linear equation mapped to the region $(0, \pi/2)$, $\pi-\varphi$. Further, the sensor management component 102 may retrieve, from the subgraph 130, the linear equation mapped to the region $(0, \pi/2)$, $\pi/2-\varphi$. Though not shown, the sensor management component 102 may retrieve additional linear equations from additional subgraphs corresponding to the overlapping regions of the light signal 118 and the light signal 120.

At operation 132, the sensor management component 102 may determine the phase delay based on the linear equations. For example, box 134 illustrates the linear representations mapped to the region $(0, \pi/2)$ of the various subgraphs. In this example, the box 134 may include a linear equation 136, a linear equation 138, a linear equation 140, and a linear equation 142. In this example, the linear equation 136 may be $CS_1=\pi-\varphi$, the linear equation 138 may be $CS_2=\pi/2-\varphi$, the linear equation 140 may be $CS_3=\varphi$, and the linear equation 142 may be $CS_4=\varphi+\pi/2$. In these linear equations, the "$\varphi$" symbol may represent the phase delay. As such, the sensor management component 102 may solve for "$p$" to determine the phase delay. In this example, the sensor management component 102 may determine four individual phase delays, one for each linear equation. In such instances, the sensor management component 102 may determine a phase delay 144 based on the four individual phase delays. The phase delay 144 may represent the actual phase delay of the received light signal 112 relative to the emitted light signal 110. The sensor management component 102 may determine the phase delay 144 based on an average of the four individual phase delays. That is, the sensor management component 102 may determine a phase delay based on the linear equation 136, a phase delay based on the linear equation 138, a phase delay based on the linear equation 140, and a phase delay based on the linear equation 142. In such instances, the sensor management component 102 may determine an average of the four phase delays. Alternatively or additionally, the sensor management component 102 may determine the phase delay 144 based on selecting or otherwise determining one of the four phase delays.

At operation 146, the vehicle may be controlled based on determining a distance associated with the phase delay 144. As discussed above, the phase delay of the received signal 112 may be proportional to the distance the light signal traveled through the environment. Thus, the phase delay may indicate a distance from a ToF sensor device to a surface in the environment. As such, the sensor management component 102 and/or any other perception component may determine the distance of a surface based on the phase delay 144. For example, box 148 illustrates a vehicle following a trajectory around an object. In this example, box 148 may include a vehicle 150 and an object 152. In some examples, the sensor management component 102 may evaluate the phase delay 144 to determine the distance from the vehicle 150 to the object 152. In this example, the sensor management component 102 may determine the distance 154 represents the distance between the vehicle 150 and the object 152. The sensor management component 102 may send the distance 154 measurement to one or more other perception components, one or more prediction components, and/or one or more planning components to determine future actions of the vehicle 150. In this example, such components may determine, based at least in part on the distance 154 measurement, that the vehicle 150 is to follow the trajectory 156 around the object 152. In this manner, the vehicle 150 may be controlled based at least in part on the distance 154.

Figure 2:
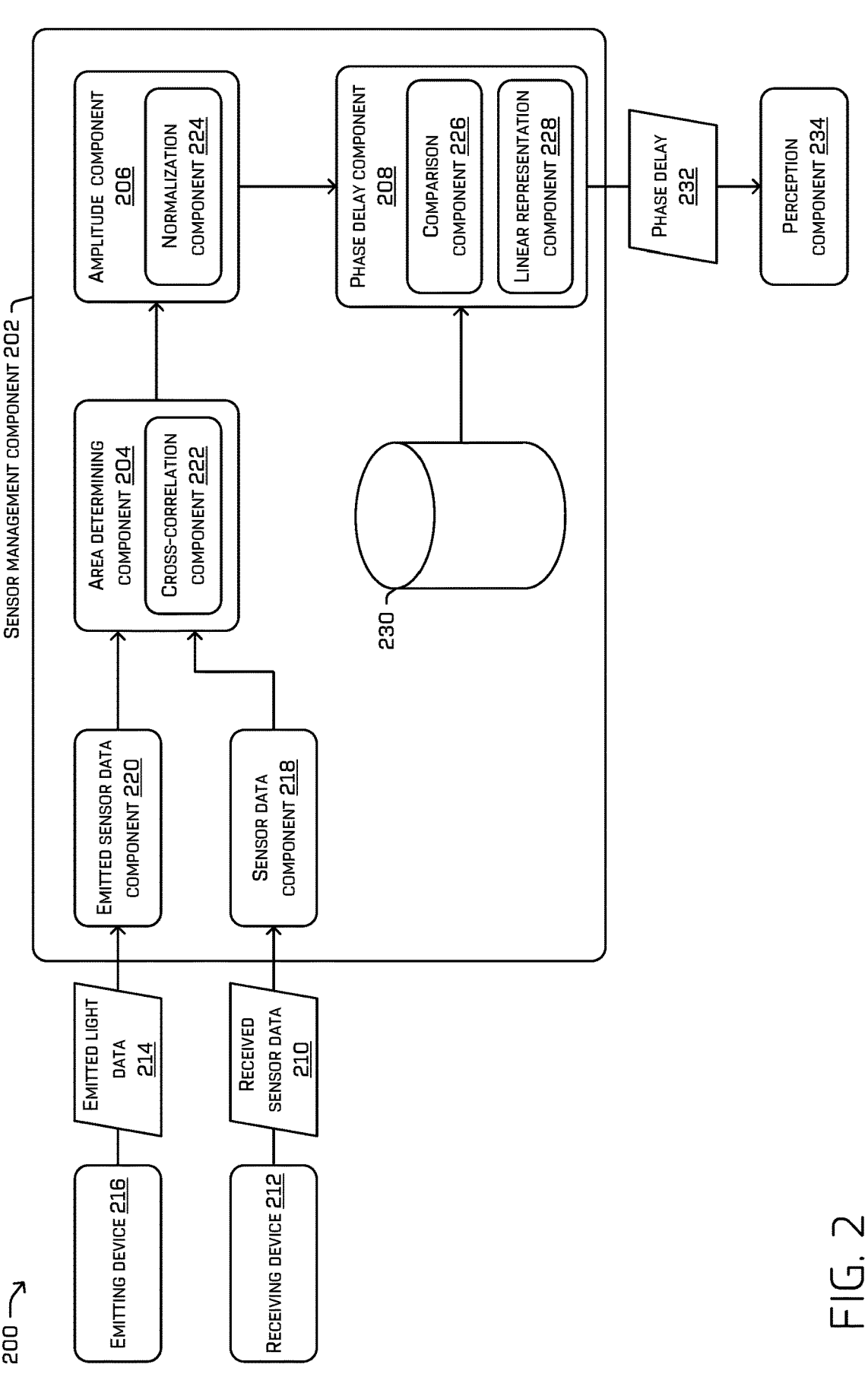
FIG. 2 illustrates an example computing system including a sensor management component configured to determine the phase delay of a return signal relative to the emitted signal, in accordance with one or more examples of the disclosure.

FIG. 2 illustrates an example computing system 200 including a sensor management component 202 configured to determine a phase delay of a returned light signal of a ToF device.

In some examples, the sensor management component 202 may be similar or identical to the sensor management component 102 described above, or in any other examples herein. As noted above, in some cases the sensor management component 202 may be implemented within or otherwise associated with a perception component, prediction component, and/or planning component of an autonomous vehicle. In some examples, the sensor management component 202 may include various components described below, configured to perform different functionalities of a technique for determining phase delays of sensor data captured by a ToF device. For instance, the sensor management component 202 may include an area determining component 204 configured to determine the area of overlapping regions between two waveforms, an amplitude component 206 configured to determine amplitude and/or normalized amplitude for various waveforms, and/or a phase delay component 208 configured to determine the phase delay of a return signal.

In some examples, the sensor management component 202 may receive sensor data from one or more sensor device(s) within (or otherwise associated with) an autonomous vehicle. For example, the sensor management component 202 may receive received sensor data 210 from a receiving device 212 and emitted light data 214 from an emitting device 216. In some examples, the receiving device 212 and the emitting device 216 may belong to the same ToF sensor device. In such instances, the ToF device may be mounted or installed at different locations on and/or within the autonomous vehicle. The receiving device 212 may positioned at a location laterally adjacent to the emitting device 216 and may be configured to receive light signals after such signals have reflected off object(s) in the environment. As shown in FIG. 2, the receiving device 212 and the emitting device 216 may provide the received sensor data 210 and the emitted light data 214 to the sensor management component 202.

In some examples, the sensor management component 202 may include a sensor data component 218 configured to receive, store, and/or synchronize received sensor data 210 from the receiving device 212 and/or an emitting sensor data component 220 configured to receive, store, and/or synchronize emitted light data 214 from the emitting device 216.

In some examples, the sensor management component 202 may include an area determining component 204 configured to determine the area of an overlapping region between two waveforms. In some examples, the area determining component 204 may include a subcomponent which may include a cross-correlation component 222. In such instances, the cross-correlation component 222 may receive the emitted light data 214 from the emitted sensor data component 220 and the received sensor data 210 from the sensor data component 218. The cross-correlation component 222 may cross-correlate (e.g., identify the region of overlap between two waveforms) the received signal with the emitted signal at four evenly spaced locations over the course of one oscillation of the received signal. The sampling location may include 0°, 90°, 180°, 270°, etc. Accordingly, the sensor management component may determine a region of overlap for each of the offset light signals. As such, since there are four offset light signals (e.g., one at 0°, one at 90°, one at 180°, and one at 270°), the cross-correlation component 222 may identify four regions of overlap—one for each of the offset light signals.

In some examples, based on the cross-correlation component 222 determining the regions of overlap, the area determining component 204 may determine the area of each of the overlapping regions. The sensor management component may determine the area of the overlapping region by integrating the overlapping region. In such instances, the sensor management component may include one or more hardware components configured to perform such area determining techniques. As such, since there are four overlapping regions, the area determining component 204 may determine four area measurements.

In some examples, the sensor management component 202 may include an amplitude component 206 configured to determine amplitude and/or normalized amplitude for various waveforms. The amplitude component 206 may receive the light signals (e.g., emitted light signal, received light signal, offset light signals, etc.), area measurements, region of overlap data, and/or any other data. In some examples, the amplitude component 206 may determine the amplitude of the received signal and/or phase delay based on analyzing the area measurements of the overlapping regions. In such instances, the amplitude component 206 may determine the amplitude by summing together the area measurements of the first, second, third, and fourth overlapping regions. That is, the sum of the four area measurements may result in a single number which may correspond to the amplitude measurement.

In some examples, the amplitude component 206 may include a subcomponent which may include a normalization component 224. The normalization component 224 may be configured to determine a normalized amplitude (which also may be referred to as a normalized correlation sample (e.g., CS)) corresponding to each of the overlapping regions and/or offset light signals. In some examples, the sensor management component 202 may determine the CS according to the following:

$$CS_i = (2\pi/\alpha)*(Q_i) \qquad \text{Equation 1}$$

Where $CS_i$ corresponds to a normalized correlation sample of the offset light signal, the $\alpha$ corresponds to the amplitude determined by summing the area measurements of each of the overlapping regions, and $Q_i$ corresponds to the area measurement of the specific overlapping region. The normalization component 224 may determine four different CS measurements—one for each of the overlapping regions or offset light signals. Such normalized values may be normalized to a range of (0, 2π).

In some examples, the sensor management component 202 may include a phase delay component 208 configured to determine the phase delay of a return signal. The phase delay component 208 may receive amplitude and/or normalized amplitude data from the amplitude component 206. In some examples, the phase delay component 208 may include various subcomponents which may include a comparison component 226 and/or a linear representation component 228. For instance, the comparison component 226 may be configured to compare the CS values to determine within which range (e.g., (0, 2π)) the phase delay of the received light signal is located. In some examples, the comparison component 226 may determine the location of the phase delay according to the following:

if $CS_1 - CS_3 \geq 0$ & $CS_4 - CS_2 \geq 0, (0, \pi/2)$ if $CS_1 - CS_3 < 0$ & $CS_4 - CS_2 \geq 0, (\pi/2, \pi)$ if $CS_1 - CS_3 \leq 0$ & $CS_4 - CS_2 < 0, (\pi, 3\pi/2)$ otherwise, $(3\pi/2, 2\pi)$          Equation 2

In some examples, the comparison component 226 may input the CS values into a comparator which may perform the above described comparisons to determine within which range the phase delay is located. That is, upon comparing the CS values, the comparison component 226 may output a range that the phase delay may be located within.

In some examples, the linear representation component 228 may be configured to determine the phase delay of the received signal relative based on linear equations. The linear representation component 228 may determine the phase delay based on linear equations that are mapped to the discretized regions between (0, 2π). In such instances, the linear representation component 228 may access a database 230 to retrieve the linear equations based on the range output by the comparison component 226. That is, if the comparison component 226 indicates (or outputs) that the phase delay is within the range (or region) of (0, π/2), the linear representation component 228 may retrieve the linear equations that are mapped to the (0, π/2) range. The database 230 may be organized by signal offsets and/or normalized ranges. In some instances, upon receiving the linear equations, the linear representation component 228 may solve the linear equations to determine the phase delay 232 of the received light signal. Upon determining the phase delay 232, the phase delay component 208 may send the phase delay 232 to a perception component 234 for further processing.

Figure 3:
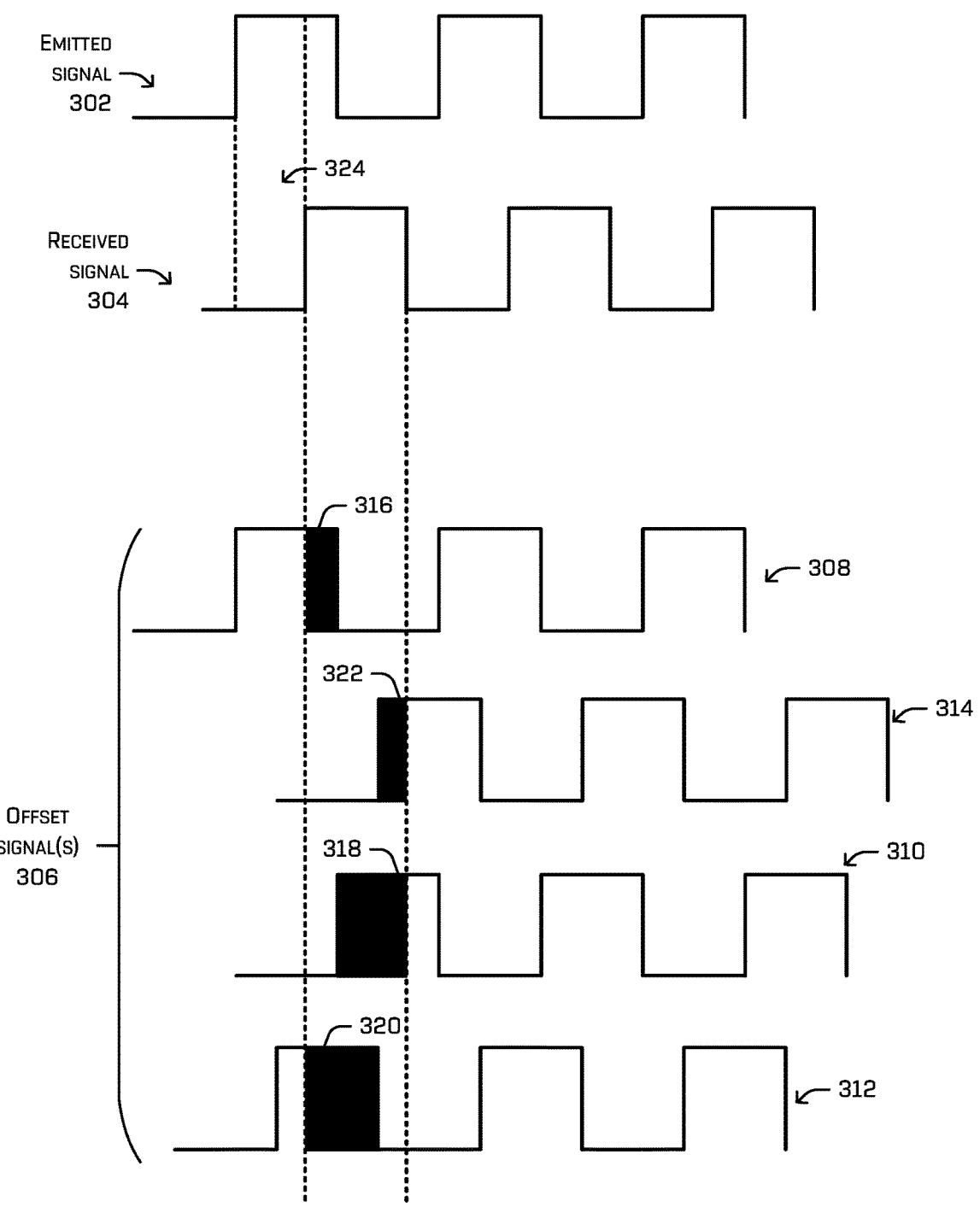
FIG. 3 illustrates an example graph of a comparison between example emitted, received, and offset light signals, in accordance with one or more examples of the disclosure.

FIG. 3 illustrates an example graph 300 of a comparison between example emitted, received, and offset light signals. Specifically, FIG. 3 illustrates overlapping regions between various offset light signals and a received light signal, and determining an area corresponding to such overlapping regions.

In this example, the example graph 300 may be similar or identical to the example graph described in FIGS. 1 and 2. In some examples, the example graph 300 may include a plurality of light signals. For instance, the example graph 300 may include an emitted signal 302, a received signal 304, and one or more offset signal(s) 306. The light signals are illustrated as square waves; however, in other examples, such signals may be represented as any other type of wave. In some examples, the emitted signal 302 may be a light signal emitted from an emitter in a ToF sensor device. In this example, the emitter may emit a continuous, modulated light signal (e.g., emitted signal 302).

In some examples, the received signal 304 may be a light signal received by a sensor receiver located laterally adjacent to the emitter. As such, the received signal 304 may be captured or otherwise received by the sensor receiver after the signal has reflected off one or more objects in the environment.

As described throughout, the vehicle may determine a phase delay 324 of the received signal 304 relative to the emitted signal 302. In such instances, the vehicle may use the phase delay 324 to determine the depth measurements of one or more pixels associated with the received signal 304. Accordingly, to determine the phase delay 324, the vehicle can determine one or more linear equations associated with one or more of the offset signals 306. In some examples, the vehicle may cross-correlate the received signal 304 with the emitted signal 302 at four evenly spaced locations over the course of one oscillation of the received signal 304. Accordingly, the vehicle may sample different offsets of the emitted signal 302. As shown, FIG. 3 may include four offset signals 306 which may correspond to the emitted signal 302. For instance, the offset signals may include an offset signal 308, an offset signal 314, an offset signal 310, and an offset signal 312. Such offset signals may be offset by 0°, 90°, 180°, or 270° relative to the emitted signal 302. In some examples, the offset signals may be generated or otherwise determined by hardware components of the ToF device.

In some examples, the vehicle may determine regions of overlap between the received signal 304 and the offset signals 306. For example, the vehicle may determine a region of overlap 316 between the received signal 304 and the offset signal 308, a region of overlap 318 between received signal 304 and the offset signal 310, a region of overlap 320 between the received signal 304 and the offset signal 312, a region of overlap 322 between the received signal 304 and the offset signal 314. In some examples, the vehicle may analyze the regions of overlap to determine the phase delay. Specifically, the vehicle may determine an area measurement of each overlapping region. That is, the vehicle may determine an area measurement corresponding to the region of overlap 316, an area measurement corresponding to the region of overlap 318, an area measurement corresponding to the region of overlap 320, and an area measurement corresponding to the region of overlap 322. In some examples, the vehicle may use the area measurements to determine an amplitude and/or normalized amplitude (or normalized correlation samples (CS)) values.

Figure 4:
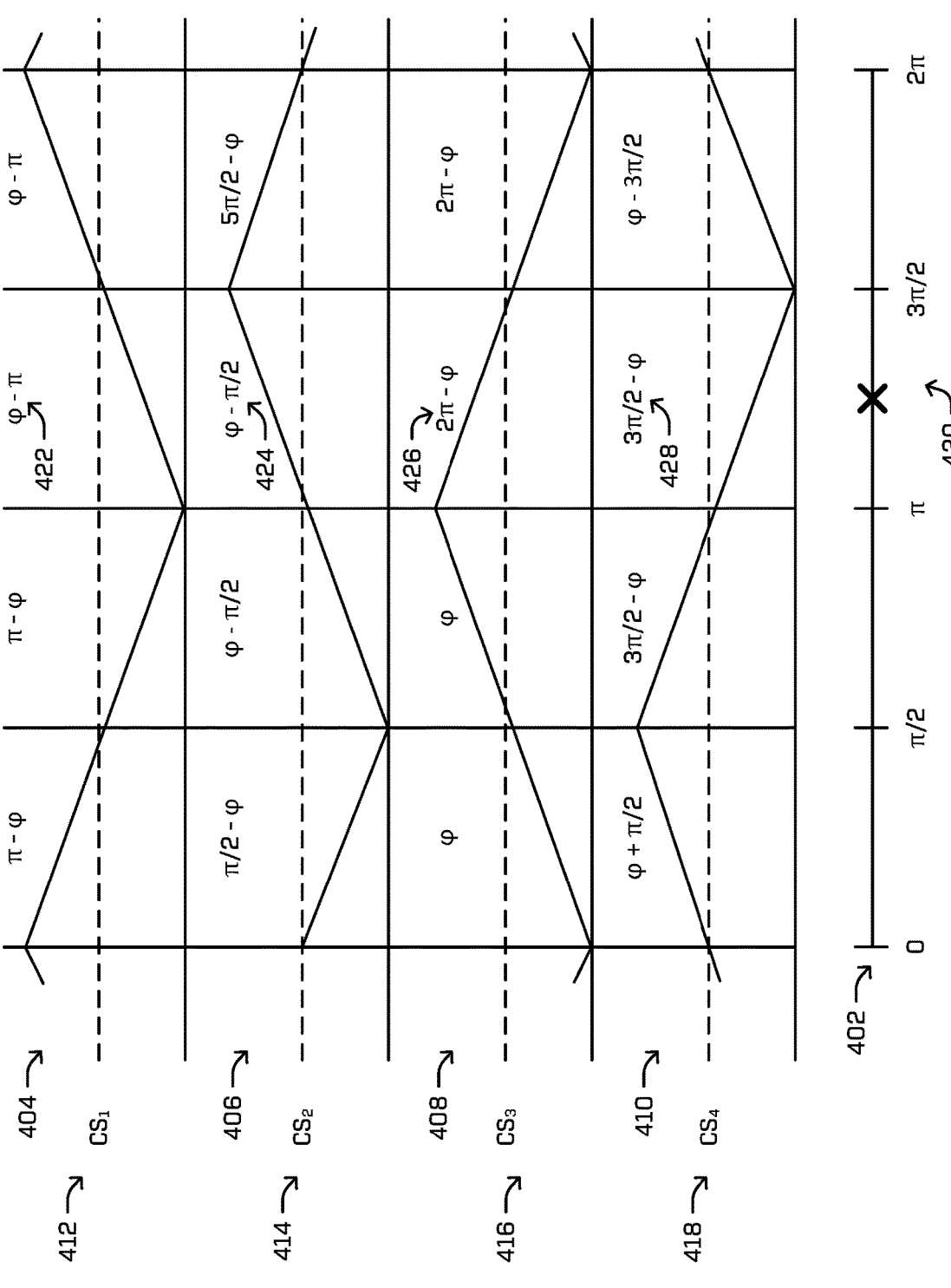
FIG. 4 illustrates an example graph including linear representations mapped to regions of a wave cycle, in accordance with one or more examples of the disclosure.

FIG. 4 illustrates an example graph 400 including linear representations mapped to regions of a wave cycle.

In this example, the example graph 400 may be similar or identical to the example graph described in FIGS. 1 and 2. In some examples, the example graph 400 may include multiple linear equations mapped to various signal offsets and regions of an oscillation cycle (e.g., $(0, 2\pi)$). As shown, the example graph 400 may include a timeline 402 that is discretized into various ranges of the oscillation cycle of a received light signal. In this example, the timeline 402 may start at "0" and span to "$2\pi$;" however, in other examples, the timeline 402 may start or stop at different time ranges. As shown, the timeline may include one or more markings at each $\pi/2$. Accordingly, the timeline 402 may include "0," "$\pi/2$," "$\pi$," "$3\pi/2$," and "$2\pi$."

Further, the example graph 400 may include four linear graphs, each corresponding to an offset signal (as described and shown in FIGS. 1-3). For example, the example graph 400 may include a subgraph 404 which may correspond to an offset signal (offset signal 308), a subgraph 406 which may correspond to the offset signal 314, a subgraph 408 which may correspond to the offset signal 310, and a subgraph 410 which may correspond to the offset signal 312. In some examples, the example graph 400 may also include the normalized CS value that corresponds to the subgraph. That is, the CS value 412 may be the normalized amplitude of the offset signal 308, the CS value 414 may be the normalized amplitude of the offset signal 314, the CS value 416 may be the normalized amplitude of the offset signal 310, and the CS value 418 may be the normalized amplitude of the offset signal 312.

In some examples, the subgraphs may be discretized according to the regions of the timeline 402. That is, each of the subgraphs may include four regions (or ranges)—a region from $(0, \pi/2)$, a region from $(\pi/2, \pi)$, a region from $(\pi, 3\pi/2)$, and a region from $(3\pi/2, 2\pi)$ Further, each region of each subgraph may include a unique linear equation that, along with the normalized amplitude value, may enable the vehicle to determine the phase delay of the received signal. For example, as shown in FIG. 4, the timeline 402 may include an "X" that represents the region of the timeline 402 that the phase delay is located within. The sensor management component may determine which region of the timeline 402 the phase delay is located in based on inputting the normalized amplitude values to a comparator and receiving, as output, a region of the timeline 402. As shown, the region 420 may be $(\pi, 3\pi/2)$. In such instances, the vehicle may retrieve the linear equations within the region $(\pi, 3\pi/2)$ for each subgraph. That is, the vehicle may retrieve the linear equation 422 $CS_1 = \varphi - \pi$ from the subgraph 404, the linear equation 424 $CS_2 = \varphi - \pi/2$ from the subgraph 406, the linear equation 426 $CS_3 = 2\pi - \varphi$ from the subgraph 408, and the linear equation 428 $CS_4 = 3\pi/2 - \varphi$ from the subgraph 410.

In some examples, the vehicle may solve for "$\varphi$" for each of the linear equations. As such, upon solving for "$\varphi$" (or the phase delay), the vehicle may determine the phase delay of the received signal based on selecting one of the individual phase delays, or the vehicle may determine the phase delay based on an average of the four individual phase delays.

Figure 5:
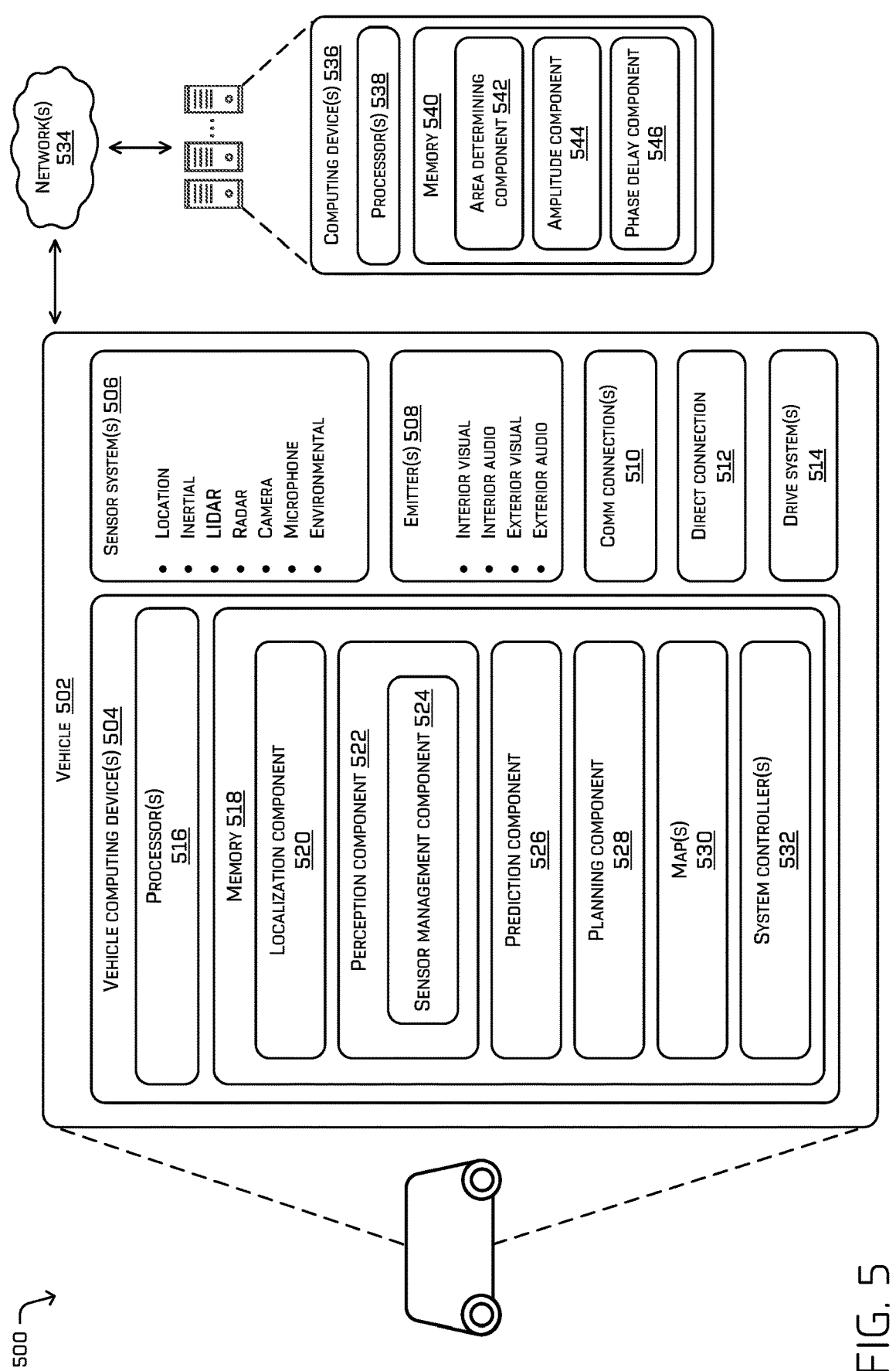
FIG. 5 depicts a block diagram of an example system for implementing various techniques described herein.

FIG. 5 is a block diagram of an example system 500 for implementing the techniques described herein. In at least one example, the system 500 may include a vehicle, such as vehicle 502. The vehicle 502 may include one or more vehicle computing devices 504, one or more sensor systems 506, one or more emitters 508, one or more communication connections 510, at least one direct connection 512, and one or more drive systems 514.

The vehicle computing device 504 may include one or more processors 516 and memory 518 communicatively coupled with the processor(s) 516. In the illustrated example, the vehicle 502 is an autonomous vehicle; however, the vehicle 502 could be any other type of vehicle, such as a semi-autonomous vehicle, or any other system having at least an image capture device (e.g., a camera-enabled smartphone). In some instances, the autonomous vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 502 may be a fully or partially autonomous vehicle having any other level or classification.

In the illustrated example, the memory 518 of the vehicle computing device 504 stores a localization component 520, a perception component 522 including a sensor management component 524, a prediction component 526, a planner component 528, one or more system controllers 532, and one or more maps 530 (or map data). Though depicted in FIG. 6 as residing in the memory 518 for illustrative purposes, it is contemplated that the localization component 520, the perception component 522 including the sensor management component 524, the prediction component 526, the planner component 528, system controller(s) 532, and/or the map(s) may additionally, or alternatively, be accessible to the vehicle 502 (e.g., stored on, or otherwise accessible by, memory remote from the vehicle 502, such as, for example, on memory 540 of one or more computing device 536 (e.g., a remote computing device)). In some examples, the memory 540 may include an area determining component 542, an amplitude component 544, and a phase delay component 546.

In at least one example, the localization component 520 may include functionality to receive sensor data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 530, and may continuously determine a location and/or orientation of the vehicle 502 within the environment. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 502. In some instances, the localization component 520 may provide data to various components of the vehicle 502 to determine an initial position of the vehicle 502 for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 526 may generate one or more probability maps representing prediction probabilities of possible locations of one or more objects in an environment. For example, the prediction component 526 may generate one or more probability maps for vehicles, pedestrians, animals, and the like within a threshold distance from the vehicle 502. In some instances, the prediction component 526 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 526 may generate predicted trajectories of objects (e.g., objects) in an environment. For example, the prediction component 526 may generate one or more predicted trajectories for objects within a threshold distance from the vehicle 502. In some examples, the prediction component 526 may measure a trace of an object and generate a trajectory for the object based on observed and predicted behavior. Additionally, the prediction component 526 may be perform any of the techniques described with respect to any of FIGS. 1-6 above with respect to receiving, retrieving, determining, and/or generating predicted trajectories for object(s) within the environment.

In general, the planner component 528 may determine a path for the vehicle 502 to follow to traverse through an environment. For example, the planner component 528 may determine various routes and trajectories and various levels of detail. For example, the planner component 528 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 528 may generate an instruction for guiding the vehicle 502 along at least a portion of the route from the first location to the second location. In at least one example, the planner component 528 may determine how to guide the vehicle 502 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 528 may select a trajectory for the vehicle 502.

In other examples, the planner component 528 may alternatively, or additionally, use data from the localization component 520, the perception component 522, and/or the prediction component 526 to determine a path for the vehicle 502 to follow to traverse through an environment. For example, the planner component 528 may receive data (e.g., object data) from the localization component 520, the perception component 522, and/or the prediction component 526 regarding objects associated with an environment. In some examples, the planner component 528 receives data for relevant objects within the environment. Using this data, the planner component 528 may determine a route to travel from a first location (e.g., a current location) to a second location (e.g., a target location) to avoid objects in an environment. In at least some examples, such a planner component 528 may determine there is no such collision-free path and, in turn, provide a path that brings vehicle 502 to a safe stop avoiding all collisions and/or otherwise mitigating damage.

The sensor management component 524 may perform any of the techniques described with respect to any of FIGS. 1-5 above with respect to determining phase delay measurements.

In at least one example, the vehicle computing device 504 may include one or more system controllers 532, which may be configured to control steering, propulsion, braking, safety, emitters, communication, and other systems of the vehicle 502. The system controller(s) 532 may communicate with and/or control corresponding systems of the drive system(s) 514 and/or other components of the vehicle 502.

The memory 518 may further include one or more maps 530 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 530. That is, the map(s) 530 may be used in connection with the localization component 520, the perception component 522, the prediction component 526, and/or the planner component 528 to determine a location of the vehicle 502, detect objects in an environment, generate routes, determine actions and/or trajectories to navigate within an environment.

In some examples, the one or more maps 530 may be stored on a remote computing device(s) (such as the computing device(s) 536) accessible via network(s) 534. In some examples, multiple maps 530 may be stored based on, for example, a characteristic (e.g., type of entity, time of day, day of week, season of the year, etc.). Storing multiple maps 530 may have similar memory requirements, but increase the speed at which data in a map may be accessed.

In some instances, aspects of some or all of the components discussed herein may include any models, techniques, and/or machine-learned techniques. For example, in some instances, the components in the memory 518 (and the memory 540, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEiT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device 504. Additionally, or in the alternative, the sensor system(s) 506 may send sensor data, via the one or more networks 534, to the one or more computing device(s) 536 at a particular frequency, after a lapse of a predetermined period of time, in near real-time, etc.

The vehicle 502 may also include one or more emitters 508 for emitting light and/or sound. The emitter(s) 508 may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connections 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., computing device 536, other nearby vehicles, etc.) and/or one or more remote sensor system(s) for receiving sensor data. The communications connection(s) 510 also enable the vehicle 502 to communicate with a remote teleoperations computing device or other remote services.

The communications connection(s) 510 may include physical and/or logical interfaces for connecting the vehicle computing device 504 to another computing device or a network, such as network(s) 534. For example, the communications connection(s) 510 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive module with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

In at least one example, the localization component 520, the perception component 522, the sensor management component 524, the prediction component 526, the planner component 528, the one or more system controllers 532, and the one or more maps 530 may process sensor data, as described above, and may send their respective outputs, over the one or more network(s) 534, to the computing device(s) 536. In at least one example, the localization component 520, the perception component 522, the sensor management component 524, the prediction component 526, the planner component 528, the one or more system controllers 532, and the one or more maps 530 may send their respective outputs to the computing device(s) 536 at a particular frequency, after a lapse of a predetermined period of time, in near real-time, etc.

In some examples, the vehicle 502 may send sensor data to the computing device(s) 536 via the network(s) 534. In some examples, the vehicle 502 may receive sensor data from the computing device(s) 536 and/or remote sensor system(s) via the network(s) 534. The sensor data may include raw sensor data and/or processed sensor data and/or representations of sensor data. In some examples, the sensor data (raw or processed) may be sent and/or received as one or more log files.

The computing device(s) 536 may include processor(s) 538 and a memory 540, which may include an area determining component 542, an amplitude component 544, and a phase delay component 546. In some examples, the memory 540 may store one or more of components that are similar to the component(s) stored in the memory 518 of the vehicle 502. In such examples, the computing device(s) 536 may be configured to perform one or more of the processes described herein with respect to the vehicle 502. In some examples, the area determining component 542, the amplitude component 544, and the phase delay component 546 may perform substantially similar functions as the sensor management component 524.

The processor(s) 516 of the vehicle 502 and the processor(s) 538 of the computing device(s) 536 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and memory 540 are examples of non-transitory computer-readable media. The memory 518 and memory 540 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 5 is illustrated as a distributed system, in alternative examples, components of the vehicle 502 may be associated with the computing device(s) 536 and/or components of the computing device(s) 536 may be associated with the vehicle 502. That is, the vehicle 502 may perform one or more of the functions associated with the computing device(s) 536, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

FIG. 6 is a flow diagram illustrating an example process 600 of for receiving sensor data, determining a phase delay based on the sensor data, and controlling a vehicle based on the phase delay. As described below, the example process 600 may be performed by one or more computer computer-based components configured to implement various functionalities described herein. For instance, process 600 may be performed by a sensor management component 202. As described above, the sensor management component 202 may be integrated as an on-vehicle system. However, in other examples, the sensor management component 202 may be integrated as a separate server-based system.

Process 600 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 602, the sensor management component may cause an emitter of a ToF device to emit a first light signal. In some examples, the autonomous vehicle may include multiple ToF devices configured to receive sensor data representative of the driving environment. Such ToF devices may be located or otherwise mounted at any location in or on the vehicle. Further, such ToF devices may include one or more emitters (e.g., vertical cavity surface emitting laser (or VCSEL)) configured to emit light waves (e.g., square waves) into the environment. That is, the vehicle may include multiple ToF devices located at various different positions and/or angles, and such ToF devices may each contain multiple emitters.

At operation 604, the sensor management component may receive, from a sensor of the ToF device, a second light signal. The ToF device may include a sensor receiver (e.g., CMOS sensor) configured to capture or otherwise receive light signals (e.g., square waves) after such signals have exited the ToF device and reflected off object(s) in the environment. In some examples, the sensor receiver may be located horizontally adjacent to the emitter(s). That is, the second sensor receiver may be positioned side-by-side with the light emitter of the ToF device. In such instances, after the ToF emitter emits a light signal into the environment, the signal may reflect off one or more objects and return to the sensor receiver of the ToF device.

At operation 606, the sensor management component may determine whether the light signals are square waves. As noted above, in some examples, the emitted and/or received light signals may be square waves; however, in other examples, such light signals may be sinusoidal waveforms. In additional examples, the emitted and/or received light signals may be a mixture (or combination) of a square wave and a sinusoidal wave (e.g., based on the ToF device producing imperfect square signals). As such, if the sensor management component determines that the light signals are square waveforms (608: Yes), the sensor management component may proceed with determining the phase delay of the received light signal using one or more linear equation approaches. That is, at operation 608, the sensor management component may determine overlapping regions between the emitted and received light signals. The sensor management component may cross-correlate the signals to identify a region (or area) of overlap between the two signals. The sensor management component may cross-correlate the received signal (e.g., square wave) with the emitted signal (e.g., square wave) at four evenly spaced locations over the course of one oscillation of the received signal. Such sampling locations of the cross-correlated signal may include 0°, 90°, 180°, 270°, etc. As such, the sensor management component may determine four light signals that are offset at differing degrees and cross-correlate such offset light signals with the received signal. Accordingly, the sensor management component may determine a region of overlap for each of the offset light signals.

At operation 610, the sensor management component may determine normalized values associated with the overlapping region. To determine the normalized values, the sensor management component may determine area measurements for each of the overlapping regions, determine an amplitude of the light signals, and use the amplitude to determine the normalized amplitude (or normalized correlation sample (CS)). The sensor management component may determine the area of the overlapping region by integrating the overlapping region. In such instances, the sensor management component may determine the amplitude of the received signal by summing the area measurements of the first, second, third, and fourth overlapping regions. In some examples, based on determining the amplitude of the phase delay, the sensor management component may determine a normalized amplitude corresponding to each of the overlapping regions and/or offset light signals. In some examples, the sensor management component may determine the CS according to the following:

$$CS_i=(2\pi/\alpha)*(Q_i)$$

Equation 1

Where $CS_i$ corresponds to a normalized correlation sample of the offset light signal, the $\alpha$ corresponds to the amplitude determined by summing together the area measurements of all of the overlapping regions, and $Q_i$ corresponds to the area measurement of the specific overlapping region. For instance, the sensor management component may determine four different CS measurements—one for each of the overlapping regions or offset light signals. In such instances, the first overlapping region may correspond to a normalized value (e.g. $CS_1$) between (0, 2π), the second overlapping regions may correspond to a normalized value (e.g. $CS_2$) between (0, 2π), the third overlapping regions may correspond to a normalized value (e.g. $CS_3$) between (0, 2π), and the fourth overlapping regions may correspond to a normalized value (e.g. $CS_4$) between (0, 2π).

At operation 612, the sensor management component may determine a phase delay based on the normalized values. In some examples, the sensor management component may map the CS measurements to one or more linear representations (or linear equations) that, upon evaluation, may include the phase delay of the received light signal. In some examples, the sensor management component may include a database containing linear equations that map to specific CS measurements and light signal offsets. That is, the database may include, for the offset light signal at 90°, one or more linear equations. In such instances, the database may include one or more other linear equations for each of the other light signals offset at 0°, 180°, and/or 270°. In some examples, the linear equations may be mapped to a range of values spanning the wave oscillation cycle (e.g., (0, 2π)). For instance, for the offset light signal at 90°, the database may discretize the oscillation cycle into various ranges, such as (0, π/2), (π/2, π), (π, 3π/2), (3π/2, 2π). Of course, in other examples, there may be more or less ranges and such ranges may not be equidistant. In such examples, the database may include a linear equation mapped to each of the ranges. That is, the range of (0, π/2) may include (or map to) a first linear equation, the range (π/2, π) may include a second linear equation, the range (π, 3π/2) may include a third linear equation, and the range (3π/2, 2π) may include a fourth linear equation. In such instances, some or all of the signal offsets may also be discretized into such ranges with each range including linear equations.

In such instances, the sensor management component may compare the CS values to determine within which discretized range the phase delay is located. In such instances, the sensor management component may input the CS values into a comparator function configured to determine within which range the phase delay is located. For example, the comparator may operate according to Equation 2 as described above. For instance, if $CS_1$ is π/2, $CS_2$ is π/4, $CS_3$ is π/4, and $CS_4$ is π/2, the comparator may perform the first line of the comparison equation which may be "if $CS_1-CS_3\geq0$ & $CS_4-CS_2>0$, (0, π/2)." In this situation, the sensor management component may solve π/2 $(CS_1)-π/4$ $(CS_3)\geq0$ & π/2 $(CS_4)-π/4$ $(CS_2)$. If the condition is satisfied, the phase delay is located in the region of (0, π/2). In this case, the condition is satisfied which indicates that the phase delay is within the region of (0, π/2). In such instances, based on the comparison, the sensor management component may determine that, for each of the offset signals, the phase delay is located within a (0, π/2). As such, the sensor management component may access the database to receive the linear equations that map to (0, π/2) for each of the CS values.

In such instances, the sensor management component may determine the phase delay based on the linear equations mapped to the region of (0, π/2). The sensor management component may identify four linear equations corresponding to the four different signal offsets. In such instances, the sensor management component may determine the phase delay based on solving such linear equations. For instance, since there may be four linear equations, the sensor management component may determine the phase delay for each of the four linear equations. In such instances, to determine the phase delay of the received light signal, the sensor management component may select or otherwise determine one of the individual phase delays determined by the linear equations; however, in other examples, the sensor management component may determine that the phase delay based on an average of the four phase delays determined by the four linear equations.

At operation 614, the sensor management component may control the vehicle based on the phase delay. In some examples, the sensor management component may send the phase delay to one or more other perception components, prediction components, or planning components for further processing. In some instances, such components may use the phase delay to determine or otherwise measure the distance from the vehicle to objects in the environment. In such instances, the vehicle may use such data to determine actions for the vehicle to follow. Accordingly, the vehicle may use the phase delay and/or distance measurement to accurately determine vehicle actions. As such, the vehicle may be controlled based on such actions.

In contrast, if the sensor management component determines that the light signals are not square waveforms (608: No), the sensor management component may proceed with determining the phase delay of the received light signal using one or more linear and non-linear equations. That is, at operation 616, the sensor management component may determine a first phase delay based on non-linear equations. In some examples, the sensor management component may determine the phase delay using the non-linear equations described in U.S. application Ser. No. 17/553,420, filed on Dec. 16, 2021, and titled "Multipath Resolution of ToF Signals," the content of which is herein incorporated by reference in its entirety and for all purposes.

At operation 618, the sensor management component may determine a second phase delay based on linear equations. In some examples, the sensor management component may use the operations described in FIGS. 1-4 and operations 608-612 to determine the phase delay using linear equations.

At operation 620, the sensor management component may determine a phase delay of the received light signal based on the first and second phase delays. That is, the sensor management component may use a combination of linear and non-linear equations to determine the phase delay. For example, the sensor management component may determine the phase delay based on a weighted average of the first phase delay determined using linear equations and the second phase delay determined using non-linear equations, although any other combination is contemplated. In such instances, at operation 614, the vehicle can be controlled based on the phase delay determined by one or more linear and non-linear equations.

Example Clauses

A: A system comprising: one or more processors; and one or more non-transitory computer-readable media storing computer-executable instructions that, when executed, cause the one or more processors to perform operations comprising: causing an emitter of a time-of-flight device associated with a vehicle to emit a first light signal; receiving, from a sensor of the time-of-flight device, a second light signal; determining, based at least in part on the first light signal and the second light signal, an offset light signal associated with the first light signal; determining, based at least in part on a first overlap associated with the first light signal and the second light signal, a first area; determining, based at least in part on a second overlap associated with the offset light signal and the second light signal, a second area; determining, based at least in part on the first area and the second area, an amplitude of the second light signal; determining, based at least in part on the amplitude, a first normalized value associated with the first light signal and a second normalized value associated with the offset light signal; determining, based at least in part on comparing the first normalized value with the second normalized value, a first linear representation associated with the first light signal and a second linear representation associated with the offset light signal; determining, based at least in part on the first linear representation the second linear representation, a phase delay of the second light signal relative to the first light signal; and controlling the vehicle based at least in part on the phase delay.

B: The system of paragraph A, wherein the phase delay is a first phase delay, and wherein determining the first phase delay comprises: determining, based at least in part on the first linear representation, a second phase delay; determining, based at least in part on the second linear representation, a third phase delay; and determining, based at least in part on the second phase delay and the third phase delay, the first phase delay.

C: The system of paragraph B, wherein determining the first phase delay is based at least in part on at least one of: assigning the second phase delay or the third phase delay as the first phase delay, or determining, based at least in part on averaging the second phase delay and the third phase delay, the first phase delay.

D: The system of paragraph A, wherein the first light signal and the second light signal are square waveforms.

E: The system of paragraph A, wherein the phase delay is a first phase delay, and wherein determining the first phase delay comprises: determining, based at least in part on the first linear representation or the second linear representation, a second phase delay; determining, based at least in part on a non-linear representation, a third phase delay; and determining, based at least in part on a weighted average between the second phase delay and the third phase delay, the first phase delay.

F: One or more non-transitory computer-readable media storing instructions executable by one or more processors, wherein the instructions, when executed, cause the one or more processors to perform operations comprising: causing an emitter of a sensor device to emit a first light signal; receiving, from a sensor of the sensor device, a second light signal; determining, based at least in part on the first light signal, an offset signal; determining a first correlation value between the first light signal and the second light signal; determining a second correlation value between the offset signal and the second light signal; determining, based at least in part on comparing the first correlation value with the second correlation value, a first linear representation and a second linear representation; and determining, based at least in part on the first linear representation the second linear representation, a phase delay of the second light signal relative to the first light signal.

G: The one or more non-transitory computer-readable media of paragraph F, wherein the phase delay is a first phase delay, and wherein determining the first phase delay comprises: determining, based at least in part on the first linear representation, a second phase delay; determining, based at least in part on the second linear representation, a third phase delay; and determining, based at least in part on the second phase delay and the third phase delay, the first phase delay.

H: The one or more non-transitory computer-readable media of paragraph F, wherein the offset signal is a first offset signal, the operations further comprising: determining a second offset signal at a different offset than the first offset signal; and determining, based at least in part on the first offset signal and the second offset signal, the phase delay.

I: The one or more non-transitory computer-readable media of paragraph F, wherein the first light signal and the second light signal are square waveforms.

J: The one or more non-transitory computer-readable media of paragraph F, wherein the phase delay is a first phase delay, and wherein determining the first phase delay comprises: determining, based at least in part on the first linear representation and the second linear representation, a second phase delay; determining, based at least in part on a non-linear representation, a third phase delay; and determining, based at least in part on a weighted average between the second phase delay and the third phase delay, the first phase delay.

K: The one or more non-transitory computer-readable media of paragraph F, wherein the offset signal may be shifted based at least in part on: 0 degrees relative to the first light signal, 90 degrees relative to the first light signal, 180 degrees relative to the first light signal, or 270 degrees relative to the first light signal.

L: The one or more non-transitory computer-readable media of paragraph F, wherein determining the first linear representation and the second linear representation are based at least in part on: determining, based at least in part on a first overlap associated with the first light signal and the second light signal, a first area; determining, based at least in part on a second overlap associated with the offset signal and the second light signal, a second area; and determining an amplitude based at least in part on the first area and the second area.

M: The one or more non-transitory computer-readable media of paragraph F, the operations further comprising: controlling the operation of a vehicle based at least in part on the phase delay.

N: A method comprising: causing an emitter of a sensor device to emit a first light signal; receiving, from a sensor of the sensor device, a second light signal; determining, based at least in part on the first light signal, an offset signal; determining a first correlation value between the first light signal and the second light signal; determining a second correlation value between the offset signal and the second light signal; determining, based at least in part on comparing the first correlation value with the second correlation value, a first linear representation and a second linear representation; and determining, based at least in part on the first linear representation the second linear representation, a phase delay of the second light signal relative to the first light signal.

O: The method of paragraph N, wherein the phase delay is a first phase delay, and wherein determining the first phase delay comprises: determining, based at least in part on the first linear representation, a second phase delay; determining, based at least in part on the second linear representation, a third phase delay; and determining, based at least in part on the second phase delay and the third phase delay, the first phase delay.

P: The method of paragraph N, wherein the offset signal is a first offset signal, further comprising: determining a second offset signal at a different offset than the first offset signal; and determining, based at least in part on the first offset signal and the second offset signal, the phase delay.

Q: The method of paragraph N, wherein the first light signal and the second light signal are square waveforms.

R: The method of paragraph N, wherein the phase delay is a first phase delay, and wherein determining the first phase delay comprises: determining, based at least in part on the first linear representation and the second linear representation, a second phase delay; determining, based at least in part on a non-linear representation, a third phase delay; and determining, based at least in part on a weighted average between the second phase delay and the third phase delay, the first phase delay.

S: The method of paragraph N, wherein the offset signal may be shifted based at least in part on: 0 degrees relative to the first light signal, 90 degrees relative to the first light signal, 180 degrees relative to the first light signal, or 270 degrees relative to the first light signal.

T: The method of paragraph N, wherein determining the first linear representation and the second linear representation are based at least in part on: determining, based at least in part on a first overlap associated with the first light signal and the second light signal, a first area; determining, based at least in part on a second overlap associated with the offset signal and the second light signal, a second area; and determining an amplitude based at least in part on the first area and the second area.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the one or more processors to perform operations comprising:
    causing an emitter of a time-of-flight device associated with a vehicle to emit a first light signal;
    receiving, from a sensor of the time-of-flight device, a second light signal;
    determining, based at least in part on the first light signal and the second light signal, an offset light signal associated with the first light signal;
    determining, based at least in part on a first overlap associated with the first light signal and the second light signal, a first area;
    determining, based at least in part on a second overlap associated with the offset light signal and the second light signal, a second area;
    determining, based at least in part on the first area and the second area, an amplitude of the second light signal;

determining, based at least in part on the amplitude, a first normalized value associated with the first light signal and a second normalized value associated with the offset light signal;
    determining, based at least in part on comparing the first normalized value with the second normalized value, a first linear representation associated with the first light signal and a second linear representation associated with the offset light signal;
    determining, based at least in part on the first linear representation the second linear representation, a phase delay of the second light signal relative to the first light signal; and
    controlling the vehicle based at least in part on the phase delay.

2. The system of claim 1, wherein the phase delay is a first phase delay, and wherein determining the first phase delay comprises:
    determining, based at least in part on the first linear representation, a second phase delay;
    determining, based at least in part on the second linear representation, a third phase delay; and
    determining, based at least in part on the second phase delay and the third phase delay, the first phase delay.

3. The system of claim 2, wherein determining the first phase delay is based at least in part on at least one of:
    assigning the second phase delay or the third phase delay as the first phase delay, or
    determining, based at least in part on averaging the second phase delay and the third phase delay, the first phase delay.

4. The system of claim 1, wherein the first light signal and the second light signal are square waveforms.

5. The system of claim 1, wherein the phase delay is a first phase delay, and wherein determining the first phase delay comprises:
    determining, based at least in part on the first linear representation or the second linear representation, a second phase delay;
    determining, based at least in part on a non-linear representation, a third phase delay; and
    determining, based at least in part on a weighted average between the second phase delay and the third phase delay, the first phase delay.

6. One or more non transitory computer readable media storing instructions executable by one or more processors, wherein the instructions, when executed, cause the one or more processors to perform operations comprising:
    causing an emitter of a sensor device to emit a first light signal;
    receiving, from a sensor of the sensor device, a second light signal;
    determining, based at least in part on the first light signal, an offset signal;
    determining a first correlation value between the first light signal and the second light signal;
    determining a second correlation value between the offset signal and the second light signal;
    determining, based at least in part on comparing the first correlation value with the second correlation value, a first linear representation and a second linear representation;
    determining, based at least in part on the first linear representation the second linear representation, a phase delay of the second light signal relative to the first light signal; and controllinG a vehicle based at least in part on the phase delay.

7. The one or more non transitory computer readable media of claim 6, wherein the phase delay is a first phase delay, and wherein determining the first phase delay comprises:

determining, based at least in part on the first linear representation, a second phase delay;

determining, based at least in part on the second linear representation, a third phase delay; and determining, based at least in part on the second phase delay and the third phase delay, the first phase delay.

8. The one or more non transitory computer readable media of claim 6, wherein the offset signal is a first offset signal, the operations further comprising:

determining a second offset signal at a different offset than the first offset signal; and determining, based at least in part on the first offset signal and the second offset signal, the phase delay.

9. The one or more non transitory computer readable media of claim 6, wherein the first light signal and the second light signal are square waveforms.

10. The one or more non transitory computer readable media of claim 6, wherein the phase delay is a first phase delay, and wherein determining the first phase delay comprises:

determining, based at least in part on the first linear representation and the second linear representation, a second phase delay;

determining, based at least in part on a non-linear representation, a third phase delay; and determining, based at least in part on a weighted average between the second phase delay and the third phase delay, the first phase delay.

11. The one or more non transitory computer readable media of claim 6, wherein the offset signal may be shifted based at least in part on:

0 degrees relative to the first light signal, 90 degrees relative to the first light signal, 180 degrees relative to the first light signal, or 270 degrees relative to the first light signal.

12. The one or more non transitory computer readable media of claim 6, wherein determining the first linear representation and the second linear representation are based at least in part on:

determining, based at least in part on a first overlap associated with the first light signal and the second light signal, a first area;

determining, based at least in part on a second overlap associated with the offset signal and the second light signal, a second area; and determining an amplitude based at least in part on the first area and the second area.

13. A method comprising:

causing an emitter of a sensor device to emit a first light signal;

receiving, from a sensor of the sensor device, a second light signal;

determining, based at least in part on the first light signal, an offset signal;

determining a first correlation value between the first light signal and the second light signal;

determining a second correlation value between the offset signal and the second light signal;

determining, based at least in part on comparing the first correlation value with the second correlation value, a first linear representation and a second linear representation;

determining, based at least in part on the first linear representation the second linear representation, a phase delay of the second light signal relative to the first light signal; and controlling the sensor device based at least in part on the phase delay.

14. The method of claim 13, wherein the phase delay is a first phase delay, and wherein determining the first phase delay comprises:

determining, based at least in part on the first linear representation, a second phase delay;

determining, based at least in part on the second linear representation, a third phase delay; and determining, based at least in part on the second phase delay and the third phase delay, the first phase delay.

15. The method of claim 13, wherein the offset signal is a first offset signal, further comprising:

determining a second offset signal at a different offset than the first offset signal; and determining, based at least in part on the first offset signal and the second offset signal, the phase delay.

16. The method of claim 13, wherein the first light signal and the second light signal are square waveforms.

17. The method of claim 13, wherein the phase delay is a first phase delay, and wherein determining the first phase delay comprises:

determining, based at least in part on the first linear representation and the second linear representation, a second phase delay;

determining, based at least in part on a non-linear representation, a third phase delay; and determining, based at least in part on a weighted average between the second phase delay and the third phase delay, the first phase delay.

18. The method of claim 13, wherein the offset signal may be shifted based at least in part on:

0 degrees relative to the first light signal, 90 degrees relative to the first light signal, 180 degrees relative to the first light signal, or 270 degrees relative to the first light signal.

19. The method of claim 13, wherein determining the first linear representation and the second linear representation are based at least in part on:

determining, based at least in part on a first overlap associated with the first light signal and the second light signal, a first area;

determining, based at least in part on a second overlap associated with the offset signal and the second light signal, a second area; and determining an amplitude based at least in part on the first area and the second area.

20. The system of claim 1, wherein determining the first linear representation comprises:

accessing a database comprising a plurality of linear equations associated with a specific signal offset.

* * * * *